(12) United States Patent
Nam et al.

(10) Patent No.: US 11,564,166 B2
(45) Date of Patent: Jan. 24, 2023

(54) WAKE-UP RESOURCE RANDOMIZATION AND SHARING

(71) Applicant: QUALCOMM Incorporated, San Diego, CA (US)

(72) Inventors: Wooseok Nam, San Diego, CA (US); Tao Luo, San Diego, CA (US); Peter Pui Lok Ang, San Diego, CA (US); Juan Montojo, San Diego, CA (US); Olufunmilola Omolade Awoniyi-Oteri, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 16/677,485

(22) Filed: Nov. 7, 2019

(65) Prior Publication Data
US 2020/0154355 A1    May 14, 2020

Related U.S. Application Data

(60) Provisional application No. 62/759,976, filed on Nov. 12, 2018, provisional application No. 62/760,036, filed on Nov. 12, 2018.

(51) Int. Cl.
*H04W 52/02* (2009.01)
*H04L 5/00* (2006.01)
*H04W 72/04* (2009.01)

(52) U.S. Cl.
CPC ....... *H04W 52/0216* (2013.01); *H04L 5/0051* (2013.01); *H04W 52/0229* (2013.01); *H04W 72/048* (2013.01)

(58) Field of Classification Search
CPC ......... H04W 52/0216; H04W 52/0229; H04W 72/048; H04L 5/0051
See application file for complete search history.

(56) References Cited

U.S. PATENT DOCUMENTS

2004/0001429 A1* 1/2004 Ma .................. H04L 5/0042
370/210
2012/0129540 A1* 5/2012 Hakola ............... H04W 72/042
455/450

(Continued)

FOREIGN PATENT DOCUMENTS

WO      2018204799 A1     11/2018
WO      WO-2018204799 A1 * 11/2018 ........... H04L 5/0051

OTHER PUBLICATIONS

International Search Report and Written Opinion—PCT/US2019/060456—ISA/EPO—dated Apr. 28, 2020.

*Primary Examiner* — Ayanah S George
(74) *Attorney, Agent, or Firm* — Patterson + Sheridan, L.L.P.

(57) ABSTRACT

Certain aspects of the present disclosure provide techniques for wake-up resource randomization for discontinuous reception operation. An example method generally includes obtaining configuration information for receiving at least one wake up signal (WUS) during an OFF duration of a discontinuous reception (DRX) mode of the UE; monitoring, during a WUS monitoring occasion occurring during the OFF duration of the DRX mode, the one or more resources for the at least one WUS based on the configuration information; and transitioning to an ON state of the DRX mode when the at least one WUS is detected in the one or more resources during the monitoring; or remaining in an OFF state of the DRX mode when the at least one WUS is not detected in the one or more resources during the monitoring.

25 Claims, 13 Drawing Sheets

(56) References Cited

U.S. PATENT DOCUMENTS

| | | | |
|---|---|---|---|
| 2014/0148118 A1* | 5/2014 | Lorenz | H04W 52/0209 |
| | | | 455/404.1 |
| 2016/0128128 A1 | 5/2016 | Ang et al. | |
| 2018/0160389 A1* | 6/2018 | Yerramalli | H04W 24/10 |
| 2018/0270756 A1 | 9/2018 | Bhattad et al. | |
| 2020/0037247 A1* | 1/2020 | Liao | H04W 52/0216 |

* cited by examiner

WAKE-UP RESOURCE RANDOMIZATION AND SHARING

CLAIM OF PRIORITY UNDER 35 U.S.C. § 119

This application claims benefit of U.S. Provisional Patent Application Ser. Nos. 62/760,036 and 62/759,976, filed Nov. 12, 2018, which are both herein incorporated by reference in their entirety.

FIELD OF THE DISCLOSURE

Aspects of the present disclosure relate to wireless communications, and more particularly, to techniques for wake-up resource randomization and sharing for discontinuous reception operation.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment (UE). The method generally includes obtaining configuration information for receiving at least one wake up signal (WUS) during an OFF duration of a discontinuous reception (DRX) mode of the UE; monitoring, during a WUS monitoring occasion occurring during the OFF duration of the DRX mode, for the at least one WUS based on the configuration information; transitioning to an ON state of the DRX mode when the at least one WUS is detected in the one or more resources during the monitoring; and remaining in an OFF state of the DRX mode when the at least one WUS is not detected in the one or more resources during the monitoring.

Certain aspects provide an apparatus for wireless communications by a user equipment (UE). The apparatus generally includes at least one processor configured to obtain configuration information receiving at least one wake up signal (WUS) during an OFF duration of a discontinuous reception (DRX) mode of the UE; monitor, during a WUS monitoring occasion occurring during the OFF duration of the DRX mode, for the at least one WUS based on the configuration information; transition to an ON state of the DRX mode when the at least one WUS is detected in the one or more resources during the monitoring; and remain in an OFF state of the DRX mode when the at least one WUS is not detected in the one or more resources during the monitoring. The apparatus also generally includes a memory coupled with the at least one processor.

Certain aspects provide an apparatus for wireless communications by a user equipment (UE). The apparatus generally includes means for obtaining configuration information for receiving at least one wake up signal (WUS) during an OFF duration of a discontinuous reception (DRX) mode of the UE; means for monitoring, during a WUS monitoring occasion occurring during the OFF duration of the DRX mode, for the at least one WUS based on the configuration information; means for transitioning to an ON state of the DRX mode when the at least one WUS is detected in the one or more resources during the monitoring; and means for remaining in an OFF state of the DRX mode when the at least one WUS is not detected in the one or more resources during the monitoring.

Certain aspects provide a non-transitory computer-readable medium for wireless communications by a user equipment (UE). The non-transitory computer-readable medium generally includes instructions that, when executed by at least one processor, cause the at least one processor to obtain configuration information for receiving at least one wake up signal (WUS) during an OFF duration of a discontinuous reception (DRX) mode of the UE; monitor, during a WUS monitoring occasion occurring during the OFF duration of the DRX mode, for the at least one WUS based on the configuration information; transition to an ON state of the DRX mode when the at least one WUS is detected in the one or more resources during the monitoring; and remain in an OFF state of the DRX mode when the at least one WUS is not detected in the one or more resources during the monitoring.

Certain aspects provide a method for wireless communications by a base station. The method generally includes determining configuration information for receiving, at a user equipment (UE), at least one wake up signal (WUS) during an OFF duration of a discontinuous reception (DRX) mode of the UE; transmitting the configuration information to the UE; and transmitting the at least one WUS in one or more resources based on the configuration information.

Certain aspects provide an apparatus for wireless communications by a base station. The apparatus generally includes at least one processor configured to determine configuration information for receiving, at a user equipment (UE), at least one wake up signal (WUS) during an OFF duration of a discontinuous reception (DRX) mode of the UE; transmit the configuration information to the UE; and transmit the at least one WUS in one or more resources based on the configuration information. The apparatus also generally includes a memory coupled with the at least one processor.

Certain aspects provide an apparatus for wireless communications by a base station. The apparatus generally includes means for determining configuration information, at a user equipment (UE), at least one wake up signal (WUS) during an OFF duration of a discontinuous reception (DRX) mode of the UE; means for transmitting the configuration information to the UE; and means for transmitting the at least one WUS in one or more resources based on the configuration information.

Certain aspects provide a non-transitory computer-readable medium for wireless communications by a base station. The non-transitory computer-readable medium generally includes instructions that, when executed by at least one processor, cause the at least one processor to determine configuration information for receiving, at a user equipment (UE), at least one wake up signal (WUS) during an OFF duration of a discontinuous reception (DRX) mode of the UE; transmit the configuration information to the UE; and transmit the at least one WUS in one or more resources based on the configuration information.

Certain aspects of the present disclosure also provide various apparatus, means, and computer readable medium configured to perform (or cause a processor to perform) the operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for wake-up resource randomization and sharing for discontinuous reception (DRX) operation. For example, aspects of the present disclosure provide techniques to help alleviate blocking and false wake-up issues when user equipments share a same set of wake-up signal resources and operate in a DRX mode. In some cases, to help alleviate these issues, aspects of the present disclosure provide UE-specific hopping patterns and scrambling sequence hopping patterns, described in greater detail below.

The following description provides examples of mobility-aware access control in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
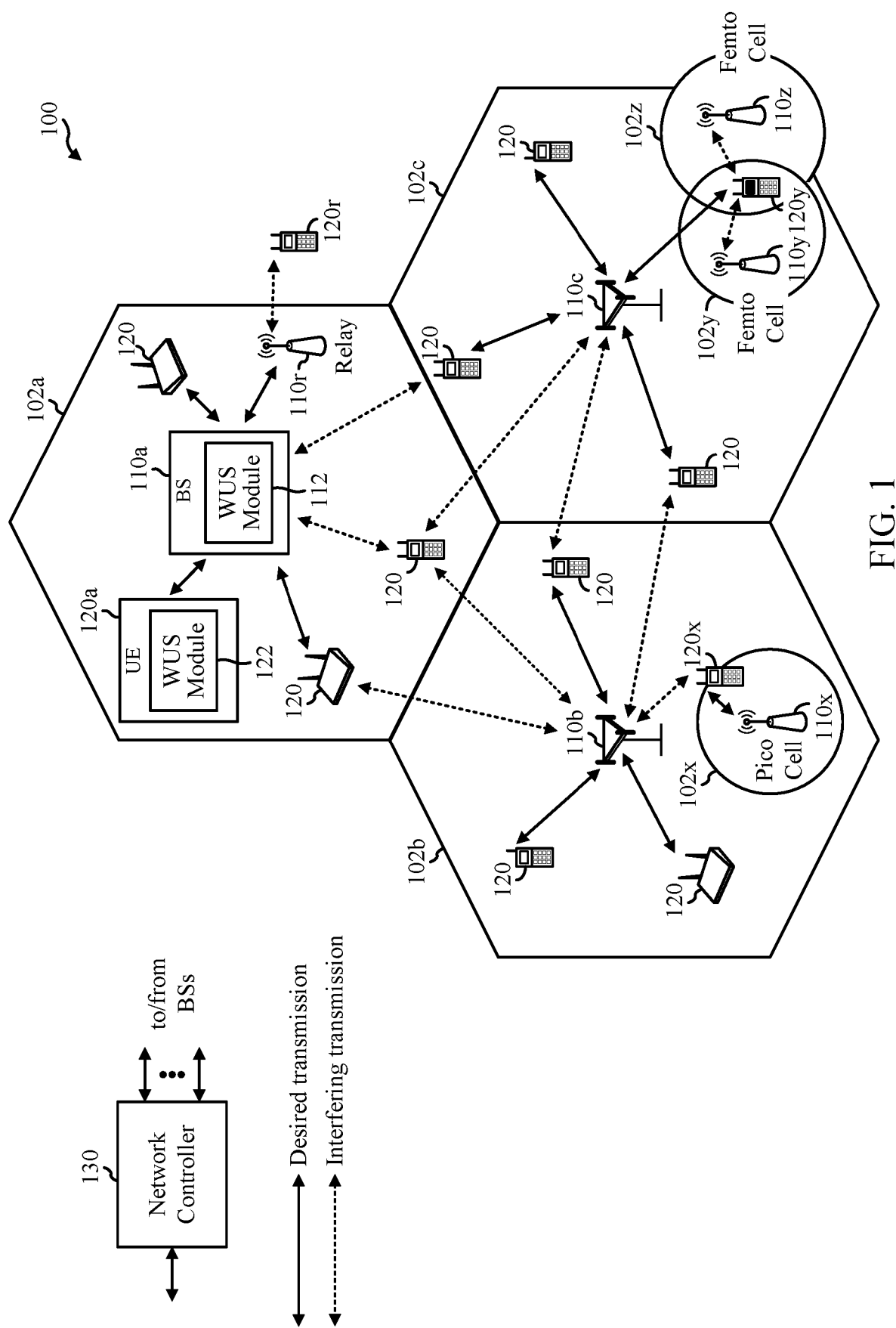
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for mobility-aware access control as described herein. As shown in FIG. 1, the BS 110a includes a wake-up signal (WUS) module 112. The WUS module 112 may be configured to perform the operations illustrated in one or more of FIGS. 8 and 11 for wake-up resource randomization and sharing, in accordance with aspects of the present disclosure. Additionally, as shown in FIG. 1, the UE 120a includes a WUS module 122. The WUS module 122 may be configured to perform the operations illustrated in one or more of FIGS. 7 and 10 for wake-up resource randomization and sharing, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
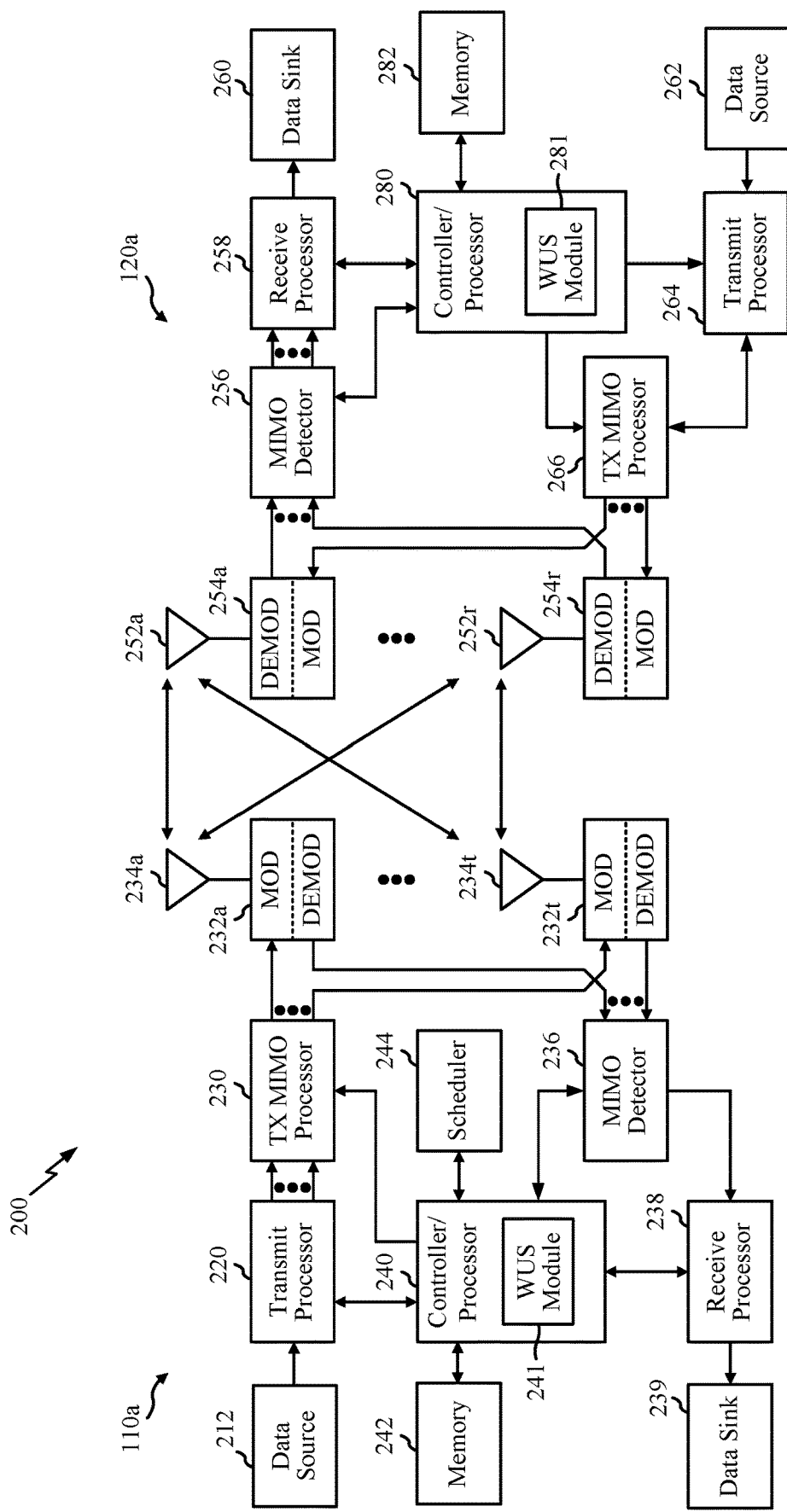
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a includes an wake-up signal (WUS) module 241 that may be configured to perform the operations illustrated in one or more of FIGS. 8 and 11 for wake-up resources randomization and sharing, according to aspects described herein. As shown in FIG. 2, the controller/processor 280 of the UE 120a includes WUS module 281 that may be configured to perform the operations illustrated in one or more of FIGS. 7 and 10 for wake-up resource randomization and sharing, according to aspects described herein. Although shown at the Controller/Processor, other components of the UE 120a and BS 110a may be used performing the operations described herein.

Example C-DRX with Beamforming and Wake-Up Signals

Figure 3:
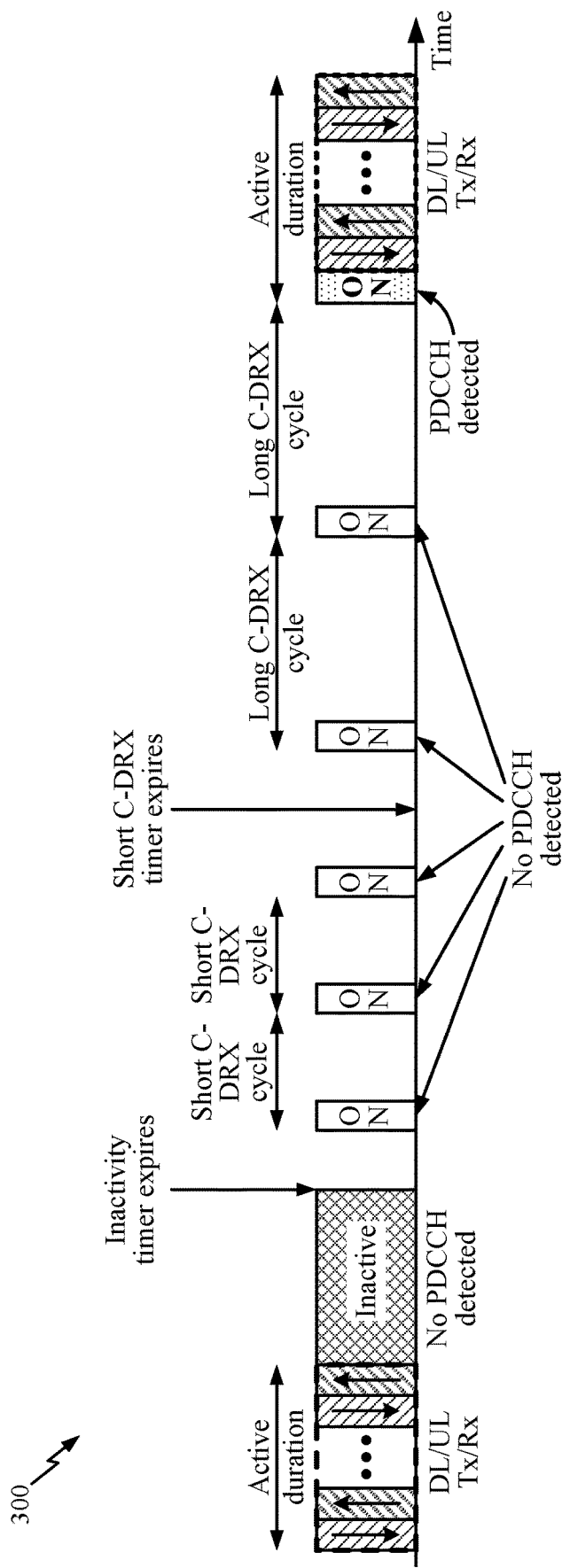
FIG. 3 illustrates connected discontinuous reception (C-DRX) operations, in which aspects of the present disclosure may be practiced.

As illustrated in the example timing diagram 300 of FIG. 3, during periods of traffic inactivity, UE may switch to connected mode discontinuous reception (C-DRX) operation for power saving. In C-DRX, when there is no data transmission in either direction (UL/DL) for a UE in an RRC connected mode, the UE goes into the DRX mode. In C-DRX, the UE monitors the PDCCH channel discontinuously. In other words UE alternates between sleep (DRX OFF) cycles and wake (DRX ON) cycles. C-DRX results in power savings because, without the DRX cycles, the UE would needlessly monitor for PDCCH transmissions in every subframe to check if there is downlink data available.

A UE may be configured for C-DRX according to various configuration parameters, such as an inactivity timer, short DRX timer, short DRX cycle, and long DRX cycle.

As illustrated in FIG. 3, based on configured cycles, UE wakes up occasionally for ON durations and monitors for PDCCH transmissions. Except for ON durations, the UE may remain in a low power (sleep) state referred to as an OFF duration, for the rest of C-DRX cycle. During the OFF duration, the UE is not expected to transmit and receive any signal.

As illustrated, the UE may wake-up at a termination of C-DRX mode. For example, if the UE detects a PDCCH scheduling data during an ON duration, UE remains on to transmit and receive data. Otherwise, the UE goes back to sleep at the end of the ON duration.

Figure 4:
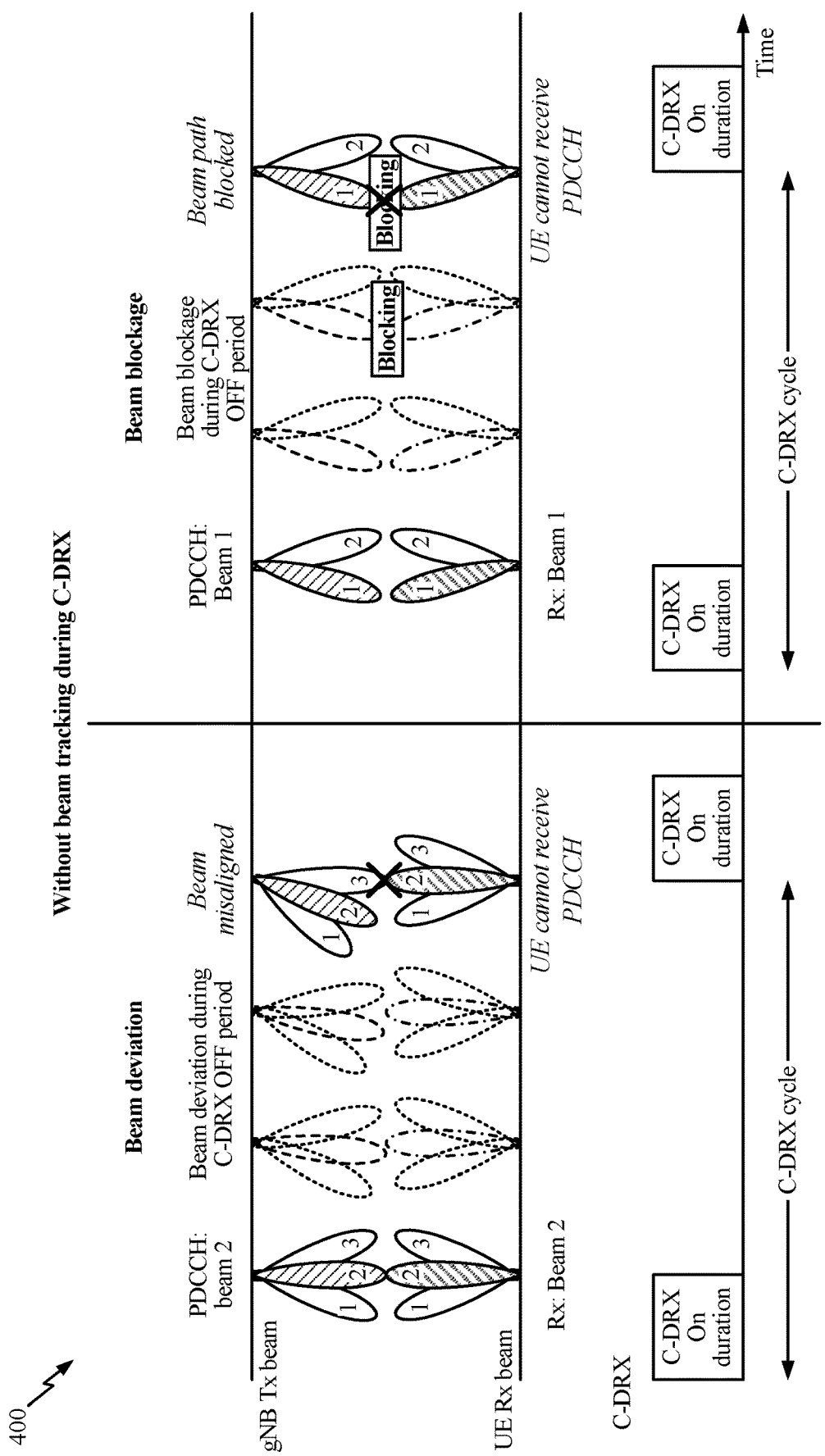
FIG. 4 illustrates C-DRX with beamforming, in which aspects of the present disclosure may be practiced.

As illustrated in the example timing diagram 400 of FIG. 4, in some cases, to enhance possibility or reaching the UE, beamforming may be used with C-DRX. While beamforming may enhance communications, it is not without challenges. For example, without beam tracking, beam pairs may degrade during C-DRX OFF period. The longer the C-DRX cycle, the more vulnerable transmissions are to beam degradation. While shorter C-DRX cycles may be less prone to beam degradation, shorter periods suffer from a power consumption penalty.

As illustrated in FIG. 4, due beam deviation by UE orientation change or mobility (or beam blocking or MPE, etc.), a UE may not be able to receive PDCCH in the beginning of the next C-DRX ON duration and fail to wake-up.

Figure 5:
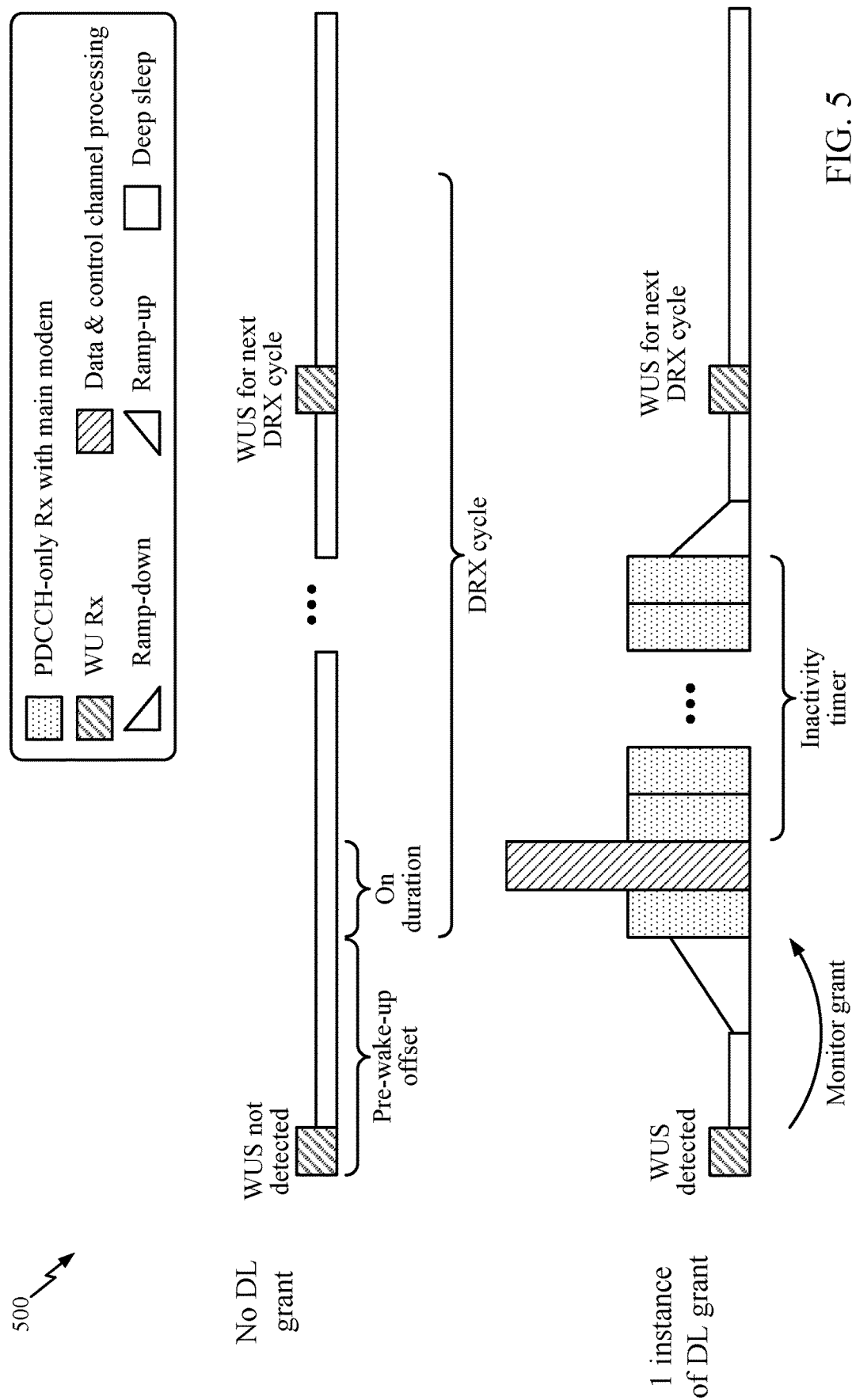
FIG. 5 illustrates example C-DRX with wake-up signals (WUS), in which aspects of the present disclosure may be practiced.

In some cases, sleep (OFF) durations may be extended using wake-up signals (WUS). The general principle of WUS in C-DRX is illustrated the example timing diagram 500 of in FIG. 5.

As illustrated, before C-DRX on duration, only a wake-up subsystem is turned on for WUS decoding (while the main modem is not powered on). The wake-up subsystem is typically a low complexity receiver (e.g., a simple correlator) using lower power than PDCCH decoding. The WUS may be a special waveform, such as special tone, preamble, reference-signal, or the like.

As illustrated, only when WUS is detected, the UE wakes-up the full modem for the next ON duration. Otherwise, UE skips ON duration and goes back to sleep until the next C-DRX cycle.

Figure 6:
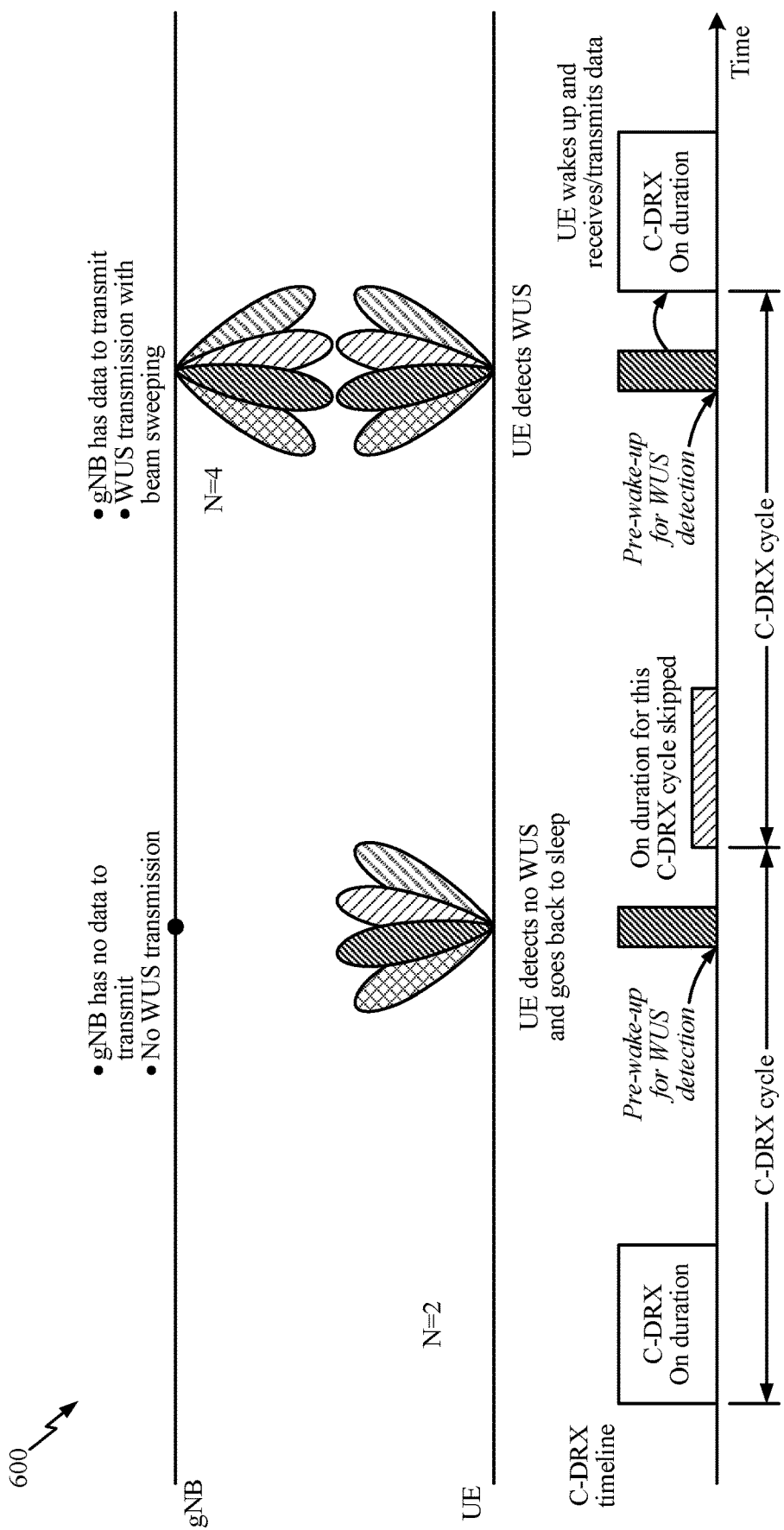
FIG. 6 illustrates example C-DRX with beamformed WUS, in which aspects of the present disclosure may be practiced.

As illustrated in the example timing diagram 600 of FIG. 6, beamforming may also be applied to WUS transmissions. For example, a set of N (e.g., out of up to 64 SSBs) beams may be configured for a UE. The value of N, and the directions of N beams, may be UE (or group)—specifically determined by gNB (e.g., as a function of link quality, UE mobility, UE capability, C-DRX cycle length, etc.).

Example Wake-up Resource Randomization and Sharing

As described above, wake-up signals (WUS) may be used to improve power efficiency during C-DRX operation. For mmW systems, which rely on beamformed Tx/Rx, beam-sweeping of WUS may be performed. As described above, sweeping N wake-up beams reduces the probability that the UE misses WUS from BS due to beam degradation (e.g., due to misalignment, blocking, etc.). In other words, if the UE detects at least one of the N wake-up beams, the UE can wake up for the next ON duration.

Additionally, although C-DRX configurations are UE-specific, multiple UEs in the cell may share the same C-DRX configuration (e.g., C-DRX cycle, ON duration offset) in practice. Sharing the same C-DRX configurations may be beneficial from NW resource/power saving perspective.

For UEs sharing the same C-DRX, WUS may be either UE-specific or group-specific. For example, for UE-specific WUS, each UE may be configured with a dedicated WUS (i.e. dedicated resource, sequence, format, scrambling, etc.). Additionally, for group-specific WUS, a group of UEs may share the same WUS. Further, regardless of whether the WUS is UE-specific or group-specific, each UE performs WUS detection within the assigned WUS resource.

UE-specific WUS and group-specific WUS both have advantages and disadvantages. For example, for UE-specific WUS, a UE may be woken up only when it is needed, which significantly reduces power consumption. However, UE-specific WUS may increase network resource requirements and, due to limited total resources, some UE's WUS transmission may be blocked, leading to potential decreases in throughput and latency increases. Further, with group-specific WUS and scrambling sequence WUS, the network requires less total WUS resources and there may be less interruption to other (e.g., non-DRX mode) UE communication. However, some UE may unnecessarily be woken up when another UE in the same group is woken up (e.g., the WUS is not intended for the UE but it gets woken up anyway), which leads to increased UE power consumption. Thus, aspects of the present disclosure provide techniques for alleviating WUS transmission blocking for UE-specific WUSs. Additionally, aspects of the present disclosure provide techniques for avoid or alleviate the false wake-up of UE when using scrambling sequence WUSs.

Example Wake-up Resource Randomization

Figure 7:
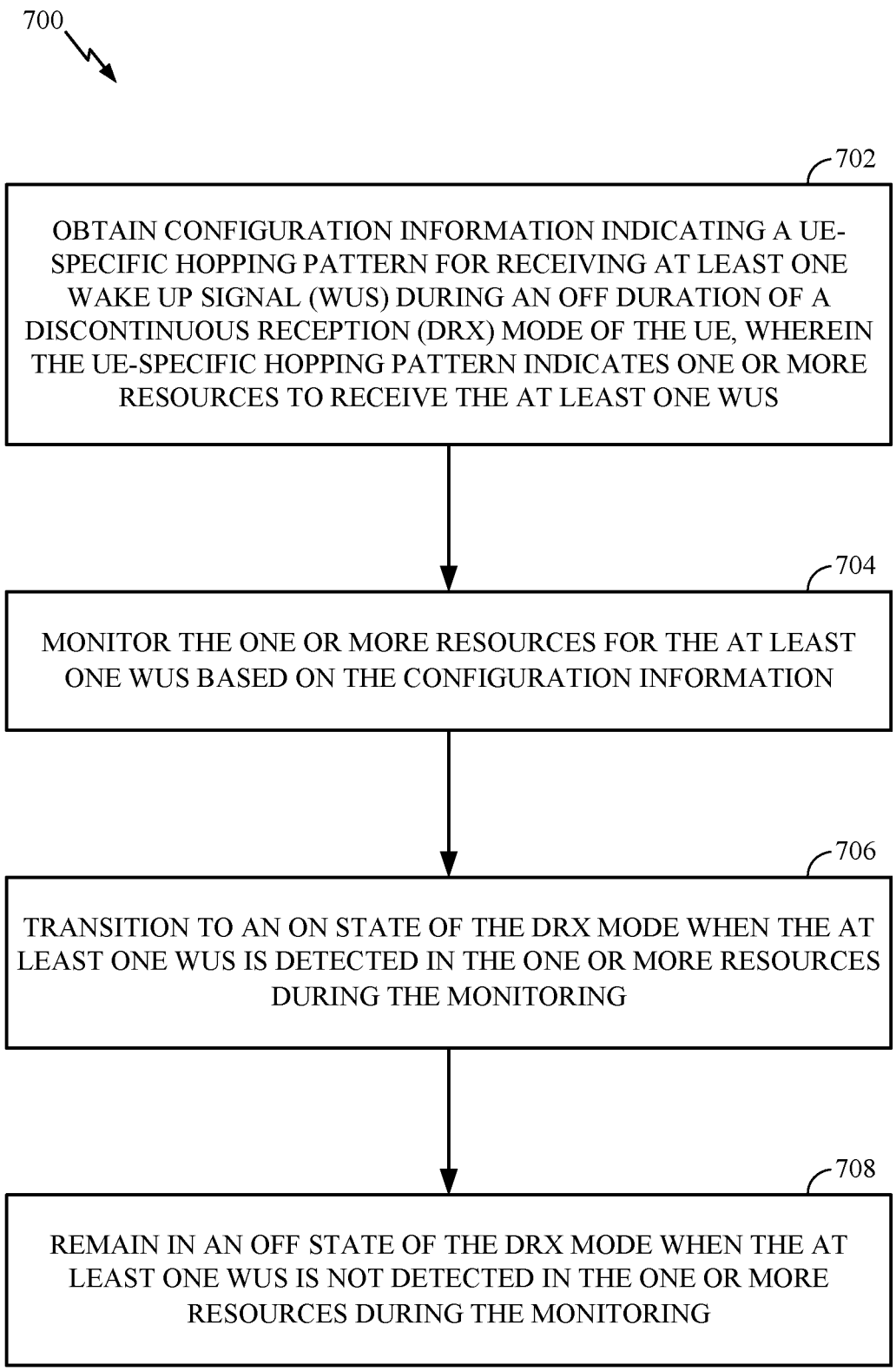
FIG. 7 illustrates example operations for wireless communications by a user equipment, in accordance with certain aspects of the present disclosure.

FIG. 7 illustrates example operations 700 for wireless communications in a network by a user equipment in the network, for example, for monitoring for WUSs transmitted during an OFF duration of a DRX mode at the UE.

According to aspects, the UE may include one or more components as illustrated in FIG. 2 which may be configured to perform the operations described herein. For example, the antenna 252, demodulator/modulator 254, controller/processor 280, and/or memory 282 as illustrated in FIG. 2 may perform the operations described herein.

Operations 700 begin at 702 by obtaining configuration information indicating a UE-specific hopping pattern for receiving at least one wake up signal (WUS) during an OFF duration of a discontinuous reception (DRX) mode of the UE, wherein the UE-specific hopping pattern indicates one or more resources to receive the at least one WUS.

At 704, the UE monitors, the one or more resources for the at least one WUS based on the configuration information. In some cases, the UE may monitor the one or more resources for the at least one WUS during a WUS monitoring occasion (e.g., window) occurring during the OFF duration of the DRX mode.

At 706, the UE transitions to an ON state of the DRX mode when the at least one WUS is detected in the one or more resources during the monitoring. However, if the UE fails to detect the at least one WUS in the one or more resources during the monitoring, operations proceed to 708.

For example, at 708, the UE remains in an OFF state of the DRX mode when the at least one WUS is not detected in the one or more resources during the monitoring.

Figure 8:
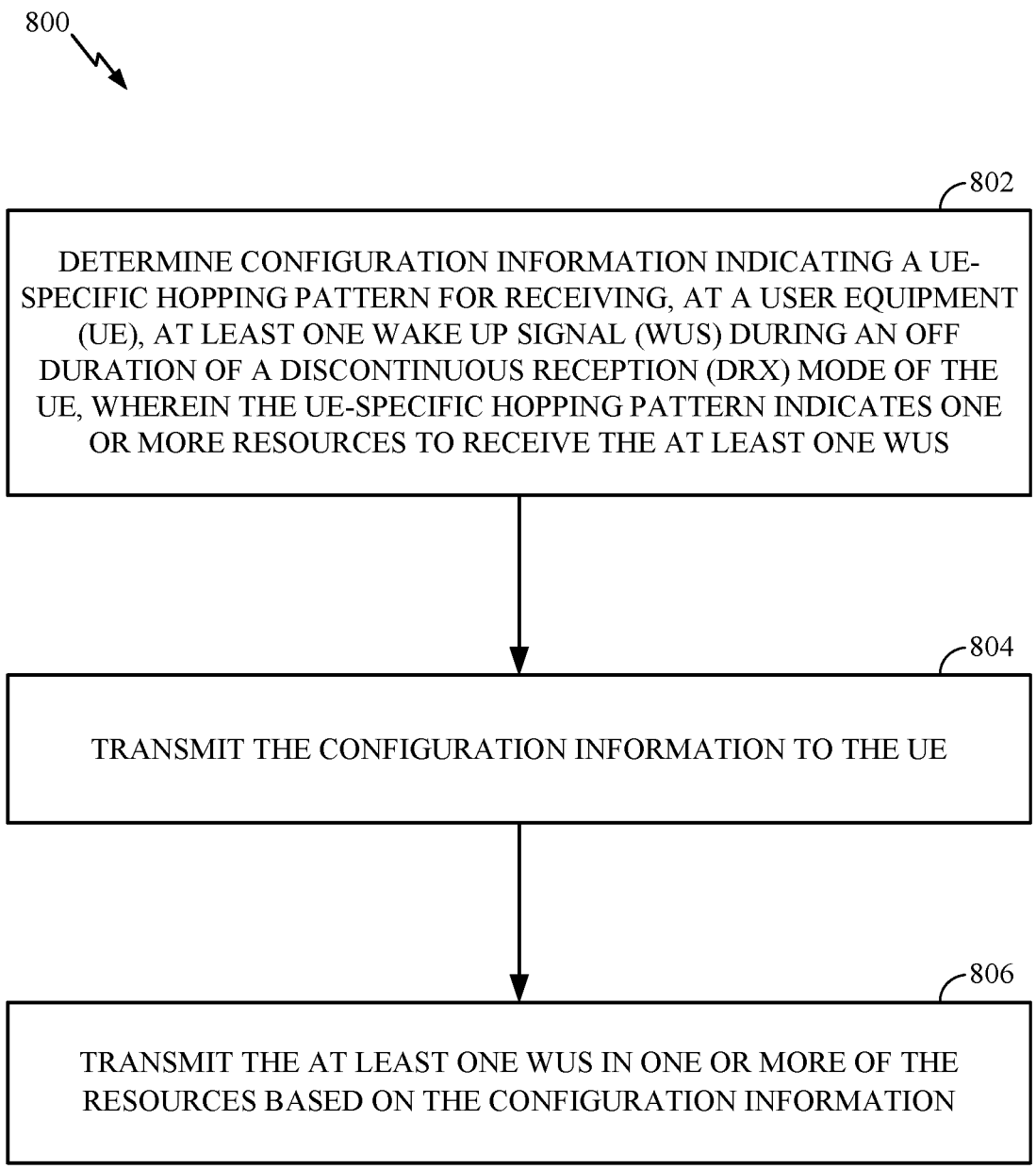
FIG. 8 illustrates example operations for wireless communications by a base station, in accordance with certain aspects of the present disclosure.

FIG. 8 illustrates example operations 800 for wireless communications by a network entity (e.g., a base station/gNB), for example, for transmitting WUSs.

According to aspects, the BS may include one or more components as illustrated in FIG. 2 which may be configured to perform the operations described herein. For example, the antenna 234, demodulator/modulator 232, controller/processor 240, and/or memory 242 as illustrated in FIG. 2 may perform the operations described herein.

Operations 800 begin at 802 by determining configuration information indicating a UE-specific hopping pattern for receiving, at a user equipment (UE), at least one wake up signal (WUS) during an OFF duration of a discontinuous reception (DRX) mode of the UE, wherein the UE-specific hopping pattern indicates one or more resources to receive the at least one WUS.

At 804, the BS transmits the configuration information to the UE.

At 806, the BS transmits the at least one WUS in one or more of the resources based on the configuration information.

As noted above, in certain cases, resource collision/blocking issues may exist for UE-specific WUSs. For example, different UEs may share the same (pool of) resources, while using different distinguishing features of UE-specific WUS (e.g., sequence, format, etc.). Thus, if a first UE's WUS occupies the shared resource first, then a second UE sharing may not be able to receive a WUS on the same resource. Additionally, since certain real-life traffic has bursty characteristics, once the blocking occurs, it is likely that the blocking persists for a certain duration (e.g., a number of C-DRX cycles), which may decrease UE throughput and increase latency. Thus, aspects of the present disclosure provide techniques to avoid or alleviate this resource collision/blocking issue.

For example, in some cases, each UE using UE-specific WUS and operating in a DRX mode may obtain configuration information including an assigned UE-specific randomization (or hopping) pattern by the network (e.g., base station). In some cases, the configuration information may be transmitted by the base station and received by the UE in at least one of a radio resource control (RRC) message, a media access control control element (MAC-CE), or a physical downlink control channel (PDCCH) message. In some cases, the DRX mode may comprise a connected mode DRX mode.

According to aspects, the UE-specific randomization (or hopping) pattern may be a sequence of numbers that correspond to available WUS resources (with conformance between BS and UE). For example the UE-specific hopping pattern may indicate one or more resources for the specific UE to receive at least one WUS.

Additionally, as noted above, the at least one WUS may be of a certain type, such as an RS-based WUS or a PDCCH-based WUS. According to aspects, for RS-based WUS, the UE-specific hopping pattern may comprise at least one of a resource element (RE)-mapping pattern for receiving the at least one WUS or a code-mapping pattern for receiving the at least one WUS. For example, WUS resource allocation may include time, frequency, and code-domain resource allocation jointly. Thus, according to aspects, an RE-mapping pattern may indicates a time/frequency resource allocation for the UE to receive the at least one WUS. Additionally, the code-mapping pattern may indicate the code-domain resource allocation to receive the at least one WUS.

According to aspects, for PDCCH-based WUS, the UE-specific hopping pattern may comprise a search-space and/or control resource set (CORESET) hopping pattern to receive the at least one WUS in a PDCCH. For example, in some cases, there may be one or more CORESETs for WUS and, within each CORESET, control channel elements (CCEs) are mapped to search spaces with different aggregation levels. At a WUS occasion, PDCCH-based WUS may be transmitted on one of the search spaces in one of the CORESETs. In the next WUS occasion, PDCCH-based WUS may be transmitted on a different search space in the same or different CORESET. In this way, across WUS occasions, the resource that the UE should monitor for PDCCH-based WUS "hops around" based on the configured CORESET and search space hopping pattern.

According to aspects, the UE-specific hopping patterns of different UEs (e.g., sharing the same C-DRX configuration) may be configured by the network/BS to minimize collision. For example, collision implies coincidence of WUS resources among UEs. Each UE's WUS resources for each WUS occasion may be determined by the configured hopping pattern. Since only one WUS may be transmitted on a WUS resource, if two UE's WUS resources coincide (collision), then BS can transmit only one UE's WUS and only one UE can receive WUS, while the other UE cannot. Thus, the network/BS may configure UE-specific hopping patterns such that WUS resource collision is minimized.

Moreover, once UE1 and UE2's WUS resources collide at certain WUS occasion and WUS for UE2 is blocked, it is unlikely to be blocked again in the next WUS occasion. For example, if the configured WUS resource hopping patterns for UE1 and UE2 are identical, the WUS resource for UE1 and UE2 will coincide (e.g., collide) all the time, which means only one UE may be woken up and served at a time. However, if the hopping patterns for UE1 and UE2 are different, even though they can occasionally coincide, they will not collide all the time.

In some cases, the configuration information may further include a periodicity (e.g., periodicity configuration information) corresponding to the one or more resources to receive the at least one WUS in the UE-specific hopping pattern. For example, the periodicity configuration information may indicate how long a particular resource is assigned to the UE to receive the at least one WUS. That is, for example, the periodicity configuration information may indicate that the UE is assigned a first resource of the one or more resources for receiving the at least one WUS for a predetermined amount of time/subframes. According to aspects, after the periodicity corresponding to the first resource has passed, the UE may be assigned (e.g., as indicated in the UE-specific hopping pattern) a different resource of the one or more resources for receiving the at least one WUS.

For example, in some cases, based on the UE-specific hopping pattern and the corresponding periodicities, the UE may switch from monitoring for the at least one WUS in the first resource to monitoring for the at least one WUS in a second resource of the one or more resources. Likewise, based on the UE-specific hopping pattern and the corresponding periodicities, the BS may switch from transmitting the at least one WUS in the first resource to transmitting the at least one WUS in the second resource of the one or more resources.

According to aspects, in some cases, the periodicity corresponding to a resource to receive the at least one WUS may be an integer multiple of a C-DRX cycle or WUS occasion periodicity.

Figure 9:
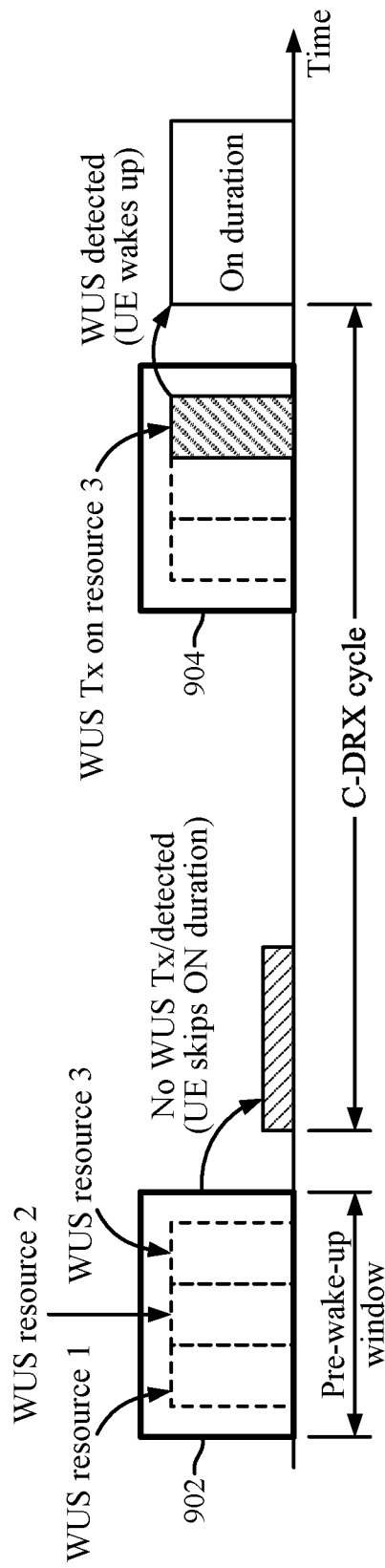
FIG. 9 illustrates an example timeline for receiving a WUS at a user equipment, in accordance with certain aspects presented herein.

FIG. 9 illustrates an example timeline for receiving a WUS at the UE, according to certain aspects presented herein. For example, as illustrated, the UE may be assigned with WUS resource 3 (e.g., as indicated in the UE-specific hopping pattern) and monitors WUS within resource 3. According to aspects, based on WUS presence detection in resource 3, the UE decides whether to skip or wake-up for the next ON duration. For example, during the first pre-wakeup window (or WUS monitoring occasion) 902, the UE monitors for the at least one WUS in resource 3. However, as illustrated, the UE may not detect the at least one WUS in resource 3. Thus, as illustrated, since the UE did not detect the at least one WUS, the UE remains in an OFF state of the DRX mode (i.e., the UE skips the ON duration of the DRX mode), saving power resources. Thereafter, during a second pre-wakeup window 904, the UE again monitors for the at least one WUS in resource 3. In this case, the UE detects the at least one WUS in resource 3 and, as a result, transitions to an ON state of the DRX mode.

Aspects of the present disclosure may also apply to scenarios where two UEs share CDRX configurations. For example, in some cases, UE1 and UE2 may share a same C-DRX configuration. According to aspects, for both UEs, UE-specific WUSs may need to be transmitted for K consecutive C-DRX cycles.

According to a conventional scheme, both UEs may be assigned with the same WUS resource, such as WUS resource 1 in FIG. 9. In this case, if a WUS for UE1 is transmitted in a C-DRX cycle in WUS resource 1, WUS for UE2 may not be transmitted in the same C-DRX cycle. Thus, only UE1 will wake up and start to monitor control and data channels during the ON duration of the C-DRX cycle and, even though there may be traffic waiting in the transmission buffer at the network for UE2, UE2 cannot be served in the C-DRX cycle. Thus, either only one of the two UEs is served for the K C-DRX cycles or each can exclusively share the K cycles.

Aspects of the present disclosure provide techniques that help alleviate this blocking issue when transmitting/receiving WUSs. For example, when UE1 and UE2 share the same CDRX cycle, UE1 may be assigned with a UE-specific WUS resource randomization/hopping pattern of {1, 1, 1} (monitoring pattern: 1, 1, 1, 1, . . . ) and UE2 may be assigned with a UE-specific WUS resource randomization/hopping pattern of {1, 2, 3} (monitoring pattern: 1, 2, 3, 1, 2, 3, . . . ). According to aspects, in this case, the two UE's WUS resources collide once in every three C-DRX cycles (e.g., when the hopping pattern indicates WUS resource 1 for both UE1 and UE2). However, in a C-DRX cycle that the WUS resources do not collide, both UEs may be served. For example, UE2 may be concurrently served by WUS resources 2 and 3 while UE1 is served by WUS resource 1. As noted above, the network may configure the hopping patterns for different UEs so as to minimize collision between WUS resources. For example, in some cases, to minimize collision, UE1 and UE2 may be assigned opposite scrambling sequence hopping patterns with WUS resource randomization/hopping patterns {1,2,3} and {3,1,2}, respectively. In this case, UE1 and UE2 may never collide and thus not be falsely woken up by a WUS intended for the other UE.

Although the above techniques are presented with relation to C-DRX operation, similar techniques may be applied to idle mode DRX (I-DRX), for example, so long as WUS is used for I-DRX (at least for paging occasion monitoring/skipping). However, during I-DRX operation, a UE may not be connected to the BS in order to receive the UE-specific hopping pattern. Thus, aspects of the present disclosure also provide techniques to facilitate WUS reception when a UE is operating in I-DRX mode.

For example, in the case when a UE is operating in I-DRX mode and is in an idle state, the UE may select its UE-specific hopping pattern based on one or more criteria, for example, without receiving the configuration information from the BS. In some cases, the one or more criteria may comprise the UE's ID (e.g. IMSI) and/or a cell ID. Thus, for example, in some cases, if there are total N UE-specific hopping patterns numbered from 1 to N, UE may use the pattern number (e.g., IMSI mod N) to determine the UE-specific hopping pattern to use for monitoring for the at least one WUS, according to aspects presented above.

According to aspects, an available set of UE-specific hopping patterns for a UE operating in I-DRX mode may be predetermined in a standards specification or broadcasted by the BS via system information. For example, the UE may receive the set of UE-specific hopping patterns in system information broadcast by a cell/BS that the UE is camping on or being served by. The UE may select the UE-specific hopping pattern to use for monitoring for the at least one WUS according to techniques described above. Additionally, in some cases, the UE may receive configuration information indicating the UE-specific hopping pattern from the BS before an RRC connection with the BS is released (i.e., while the UE is in the connected mode), for example, in an RRC release message (e.g., when entering idle mode). For example, in some cases, when transitioning from a connected mode to an idle mode, the UE may receive an RRC release message from the BS, including an indication of the UE-specific hopping pattern to use in idle mode.

Further, in some cases, the UE operating in I-DRX mode may select a periodicity corresponding to the selected UE-specific hopping pattern based on one or more criteria, such as a system frame number. The UE may then monitor for the at least one WUS in accordance with the UE-specific hopping pattern and the corresponding selected periodicity, as described above.

Example Wake-Up Resource Sharing

Figure 10:
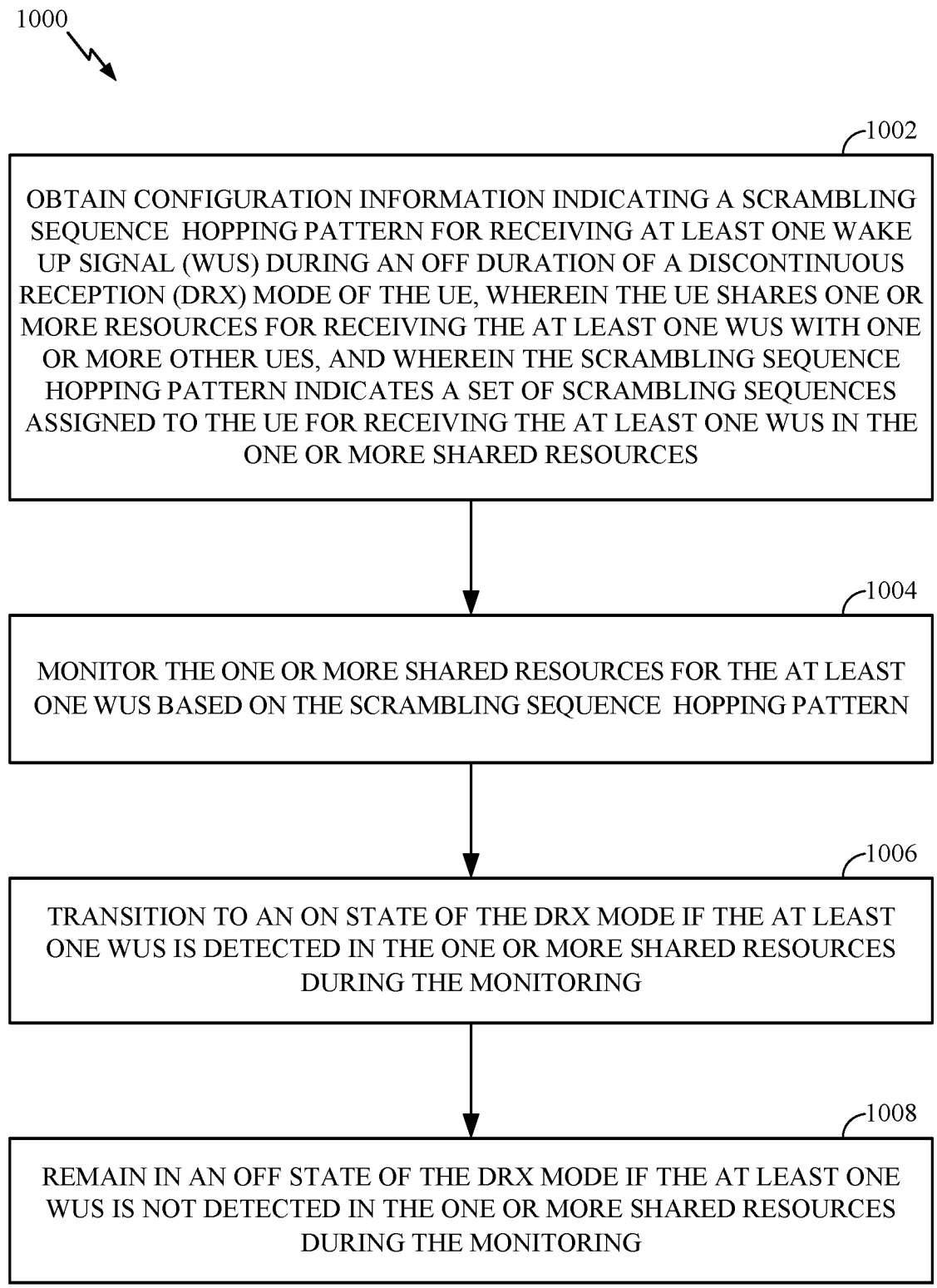
FIG. 10 illustrates example operations for wireless communications by a user equipment, in accordance with certain aspects of the present disclosure.

As noted above, aspects of the present disclosure also provide techniques for avoid or alleviate the false wake-up of UE when using scrambling sequence WUSs FIG. 10 illustrates example operations 1000 for wireless communications in a network by a user equipment in the network, for example, for monitoring for WUSs transmitted during an OFF duration of a DRX mode at the UE.

According to aspects, the UE may include one or more components as illustrated in FIG. 2 which may be configured to perform the operations described herein. For example, the antenna 252, demodulator/modulator 254, controller/processor 280, and/or memory 282 as illustrated in FIG. 2 may perform the operations described herein.

Operations 1000 begin at 1002 by obtaining configuration information indicating a scrambling sequence hopping pattern for receiving at least one wake up signal (WUS) during an OFF duration of a discontinuous reception (DRX) mode of the UE, wherein the UE shares one or more resources for receiving the at least one WUS with one or more other UEs, and wherein the scrambling sequence hopping pattern indicates a set of scrambling sequences assigned to the UE for receiving the at least one WUS in the one or more shared resources.

At 1004, the UE monitors the one or more shared resources for the at least one WUS based on the group hopping pattern. In some cases, the UE may monitor for the one or more resources for the at least one WUS during a WUS monitoring occasion (e.g., window) occurring during the OFF duration of the DRX mode.

At 1006, the UE transitions to an ON state of the DRX mode when the at least one WUS is detected in the one or more shared resources during the monitoring. However, if the UE fails to detect the at least one WUS in the one or more resources during the monitoring, operations proceed to 1008.

For example, at 1008, the UE remains in an OFF state of the DRX mode when the at least one WUS is not detected in the one or more shared resources during the monitoring.

Figure 11:
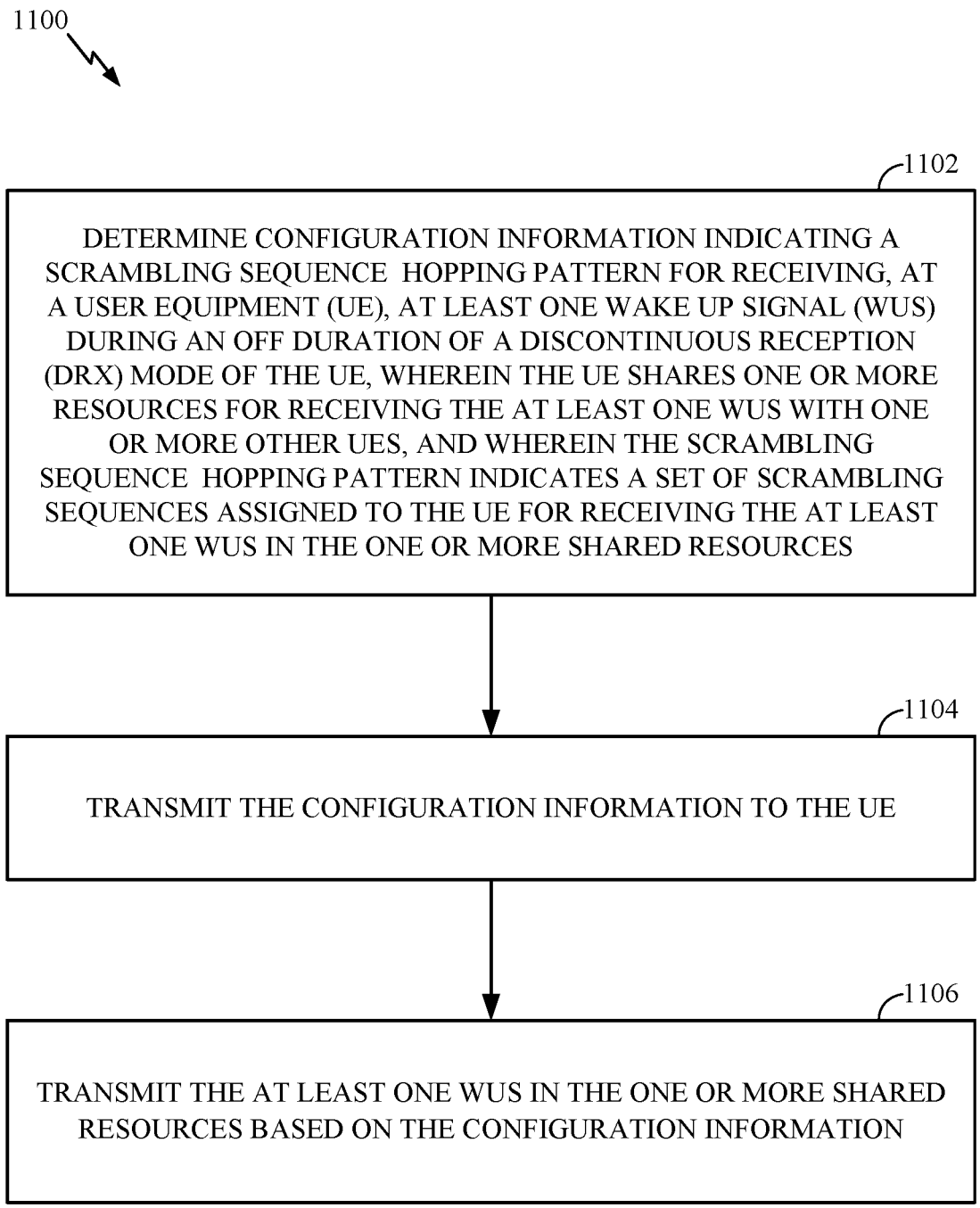
FIG. 11 illustrates example operations for wireless communications by a base station, in accordance with certain aspects of the present disclosure.

FIG. 11 illustrates example operations 1100 for wireless communications by a network entity (e.g., a base station/gNB), for example, for transmitting WUSs.

According to aspects, the BS may include one or more components as illustrated in FIG. 2 which may be configured to perform the operations described herein. For example, the antenna 234, demodulator/modulator 232, controller/processor 240, and/or memory 242 as illustrated in FIG. 2 may perform the operations described herein.

Operations 1100 begin at 1102 by determining configuration information indicating a scrambling sequence hopping pattern for receiving, at a user equipment (UE), at least one wake up signal (WUS) during an OFF duration of a discontinuous reception (DRX) mode of the UE, wherein the UE shares one or more resources for receiving the at least one WUS with one or more other UEs, and wherein the scrambling sequence hopping pattern indicates a set of scrambling sequences assigned to the UE for receiving the at least one WUS in the one or more shared resources.

At 1104, the BS transmits the configuration information to the UE.

At 1106, the BS transmits the at least one WUS in the one or more shared resources based on the configuration information.

As noted above, aspects of the present disclosure provide techniques to avoid or alleviate the false wake-up of UE. For example, in some cases, each UE (or a sub-group of UEs) in a group of UEs (sharing the same WUS resource) using scrambling sequence WUSs and operating in a DRX mode may obtain configuration information including an assigned scrambling sequence randomization (or hopping) pattern by the network (e.g., base station). In some cases, the configuration information may be transmitted by the base station/received by the UE in at least one of a radio resource control (RRC) message, a media access control control element (MAC-CE), or a physical downlink control channel (PDCCH) message. In some cases, the DRX mode may comprise a connected mode DRX mode.

According to aspects, the scrambling sequence randomization (or hopping) pattern may include a sequence of numbers that correspond to available scrambling sequences (e.g., root sequence and/or initialization sequence) used for receiving WUSs. For example the scrambling sequence hopping pattern may indicate a set of scrambling sequences that the UE should use when monitoring for the at least one WUS. That is, for example, the BS may scramble the at least one WUS with a scrambling sequence (of the set of scrambling sequences) assigned to the UE which may be used by the UE to detect the WUS. In other words, when monitoring for the at least one WUS, the UE may monitor the one or more shared resources for the at least one WUS scrambled with the scrambling sequence assigned to the UE.

According to aspects, the UE may transition to the ON state of the DRX mode when a signal (e.g., that includes the at least one WUS), detected in the one or more shared resources, is scrambled with a scrambling sequence assigned to the UE. For example, the UE may receive a signal transmitted in the one or more shared resources and determine that the signal is scrambled with the scrambling sequence assigned to the UE. Thereafter, the UE may detect the at least one WUS by decoding the signal based on the determination that the signal is scrambled with the scrambling sequence assigned to the UE. The UE may then transition to the ON state of the DRX mode based on the detection of the at least one WUS. However, in some cases, the UE may determine that the signal is not scrambled with a scrambling sequence assigned to the UE. Based on this determination that the signal is not scrambled with a scrambling sequence assigned to the UE, the UE may detect that the signal does not contain a WUS intended for the UE and may remain in the OFF state of the DRX mode based on the detection, saving power resources.

Additionally, as noted above, the at least one WUS may be of a certain type, such as an RS-based WUS or a PDCCH-based WUS. According to aspects, for RS-based WUS, a scrambling sequence assigned to the UE (e.g., of the set of scrambling sequences) may be used to scramble an RS. According to aspects, when the UE detects an RS in the one or more shared resources that is scrambled with a scrambling sequence assigned to the UE, the UE may determine that the RS is a WUS and transition to the ON state of the DRX mode.

Additionally, for PDCCH-based WUS, the at least one WUS may include at least one of a demodulation reference signal (DMRS) transmitted on a PDCCH in the one or more resources or downlink control information (DCI) transmitted on a PDCCH in the one or more resources. In this case, for a PDCCH-based WUS, the DMRS and/or the DCI may be scrambled with a scrambling sequence of the set of scrambling sequences assigned to the UE.

Thus, according to aspects, monitoring for the at least one WUS may include monitoring for a DMRS and/or DCI scrambled with a scrambling sequence assigned to the UE. For example, if, during monitoring, the UE detects that a DMRS and/or DCI in a received signal is scrambled with the scrambling sequence assigned to the UE, the UE may detect that the DMRS and/or DCI is a WUS intended for the UE. Thus, based on the detection, the UE may transition to the ON state of the DRX mode (e.g., to receive additional data). Additionally, in some cases, for PDCCH-based WUS, RNTI hopping (e.g., jointly or separately from scrambling sequence hopping) may also be considered. For example, when detecting the PDCCH-based WUS, the UE may check whether the cyclic redundancy check (CRC) of the PDCCH is scrambled by a specific RNTI based on the assigned RNTI-hopping sequence. Only when the CRC is scrambled by the RNTI assigned to the UE, the UE can succeed in decoding the PDCCH and determine that the PDCCH-based WUS is intended for the UE.

In some cases, the configuration information may further include a periodicity (e.g., periodicity configuration information) for each scrambling sequence in the set of scrambling sequences assigned to the UE for receiving the at least one WUS in the one or more shared resources. For example, the periodicity configuration information may indicate how long a particular scrambling sequence is assigned to the UE (or should be used by the UE) to receive the at least one WUS. That is, for example, the periodicity configuration information may indicate that the UE is assigned a first scrambling sequence of the set of scrambling sequences for receiving the at least one WUS for a predetermined amount of time/subframes. According to aspects, after the periodicity corresponding to the first resource has passed, the UE may be assigned (e.g., as indicated in the scrambling sequence hopping pattern) a different scrambling sequence of the set of scrambling sequences for receiving the at least one WUS.

For example, in some cases, based on the scrambling sequence hopping pattern and the corresponding periodicities (e.g., received in the configuration information), the UE may switch from monitoring for the at least one WUS using a first scrambling sequence to monitoring for the at least one WUS using a second scrambling sequence. Likewise, based on the scrambling sequence hopping pattern and the corresponding periodicities (e.g., as determined in the configuration information), the BS may switch from scrambling the at least one WUS with the first scrambling sequence to scrambling the at least one WUS with the second scrambling sequence.

According to aspects, in some cases, the periodicity (e.g., corresponding to the scrambling sequences of the set of scrambling sequences used to receive the at least one WUS) may be an integer multiple of a C-DRX cycle or WUS occasion periodicity.

According to aspects, the scrambling sequence hopping patterns for different UEs (sharing the same C-DRX configuration) may be configured by the network/BS to minimize collision. For example, assume two UEs, UE1 and UE2, share a same WUS group and that only UE1 has data to be served by BS for K consecutive C-DRX cycles, while UE2 has no data. According to a conventional scheme, both UEs may be assigned with the same WUS scrambling sequence, such as WUS scrambling sequence 1. In this case, UE1 may be woken up by a WUS transmitted on the one or more shared resources and scrambled with scrambling sequence 1 and may be served during the ON durations of the K C-DRX cycles. However, UE2 may also be (falsely) woken up for the K C-DRX cycles and monitors control and data during the ON duration due to UE2 being assigned the same WUS scrambling sequence as UE1, leading to a waste in power resources at UE2.

However, aspects of the present disclosure provide techniques that help alleviate this false wake up scenario when receiving WUSs. For example, according to aspects presented herein, UE1 may be assigned with scrambling sequence hopping pattern of {1, 1, 1} (monitoring pattern: 1, 1, 1, 1, . . . ) and UE2 may be assigned with scrambling sequence hopping pattern of {1, 2, 3} (monitoring pattern: 1, 2, 3, 1, 2, 3, . . . ). In this case, since only UE1 has data needing to be served, BS may transmit scrambling sequence WUS scrambled with scrambling sequence 1. In this case, false wake-up of UE occurs once every three C-DRX cycles and, thus, wasted energy of UE2 by false wake-up is reduced by a factor of 3. In other cases, to minimize collision, UE1 and UE2 may be assigned opposite scrambling sequence hopping patterns with scrambling sequences {1,2,3} and {3,1,2}, respectively. In this case, UE1 and UE2 may never collide and thus not be falsely woken up by a WUS intended for the other UE.

Although the above techniques are presented with relation to C-DRX operation, the same techniques may be applied for I-DRX, for example, as long as WUS is used for I-DRX (at least for paging occasion monitoring/skipping). However, during I-DRX operation, a UE may not be connected to the BS in order to receive the scrambling sequence hopping pattern. Thus, aspects of the present disclosure also provide techniques to facilitate WUS reception when a UE is operating in I-DRX mode.

For example, in the case when a UE is operating in IDRX mode and is in an idle state, the UE may select its scrambling sequence hopping pattern based on one or more criteria, for example, without a receiving the configuration information from the BS. In some cases, the one or more criteria may comprise the UE's ID (e.g. IMSI) and/or a cell ID. Thus, for example, if there are total N scrambling sequence hopping patterns, numbered from 1 to N, UE may use the pattern number (e.g., IMSI mod N) to determine the scrambling sequence hopping pattern (and set of scrambling sequences) to use for monitoring for the at least one WUS, according to aspects presented above.

According to aspects, an available set of scrambling sequence hopping patterns for a UE operating in I-DRX mode may be predetermined in a standards specification or broadcasted by the BS via system information. For example, the UE may receive the set of scrambling sequence hopping patterns in system information broadcast by a cell/BS that the UE is camping on or being served by. The UE may select the UE-specific hopping pattern to use for monitoring for the at least one WUS according to techniques described above. Additionally, in some cases, the UE may receive configuration information indicating the scrambling sequence hopping pattern from the BS before an RRC connection with the BS is released (i.e., while the UE is in the connected mode), for example, in an RRC release message (e.g., when entering idle mode). For example, in some cases, when transitioning from a connected mode to an idle mode, the UE may receive an RRC release message from the BS, including an indication of the scrambling sequence hopping pattern to use in idle mode.

Further, in some cases, the UE operating in I-DRX mode may select a periodicity corresponding to the selected scrambling sequence hopping pattern based on one or more criteria, such as a system frame number. The UE may then monitor for the at least one WUS in accordance with the set of scrambling sequences in the scrambling sequence hopping pattern and their corresponding selected periodicities, as described above.

Figure 12:
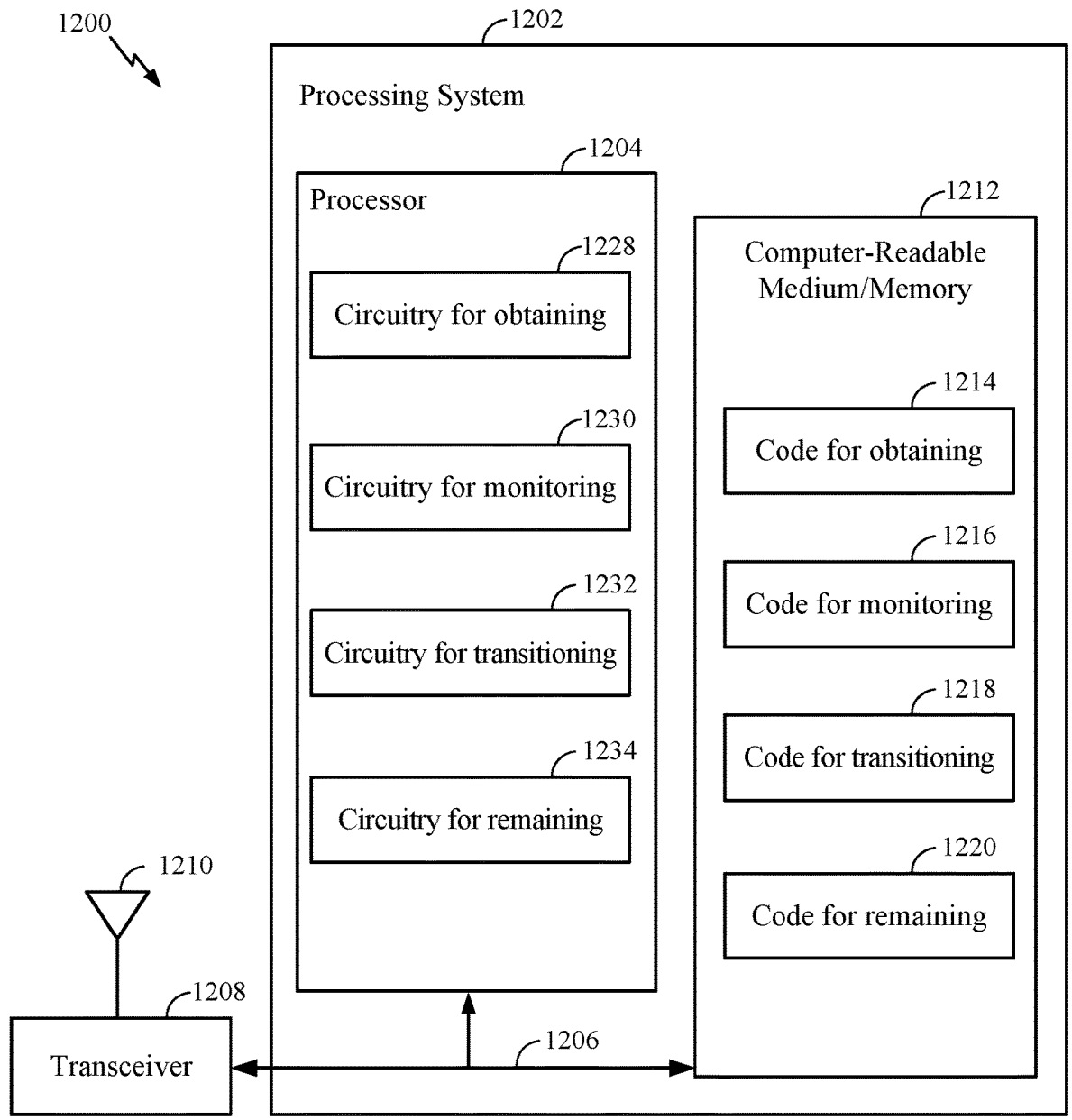
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIGS. 7-11. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 804 to perform the operations illustrated in FIGS. 7-11, or other operations for performing the various techniques discussed herein for wake-up resource randomization and sharing. In certain aspects, computer-readable medium/memory 1212 stores code for performing the operations illustrated in one or more of FIGS. 7-11. For example, computer-readable medium/memory 1212 stores code 1214 for obtaining configuration information for receiving at least one wake up signal (WUS) during an OFF duration of a discontinuous reception (DRX) mode of the UE; code 1216 for monitoring the one or more resources for the at least one WUS based on the configuration information; code 1218 for transitioning to an ON state of the DRX mode when the at least one WUS is detected in the one or more resources during the monitoring; code 1220 for remaining in an OFF state of the DRX mode when the at least one WUS is not detected in the one or more resources during the monitoring.

In certain aspects, the processor 1204 may include circuitry configured to implement the code stored in the computer-readable medium/memory 1212, such as for performing the operations illustrated in FIGS. 7-11. For example, the processor 804 includes circuitry 1228 for obtaining configuration information for receiving at least one wake up signal (WUS) during an OFF duration of a discontinuous reception (DRX) mode of the UE; circuitry 1230 for monitoring the one or more resources for the at least one WUS based on the configuration information; circuitry 1232 for transitioning to an ON state of the DRX mode when the at least one WUS is detected in the one or more resources during the monitoring; circuitry 1234 for remaining in an OFF state of the DRX mode when the at least one WUS is not detected in the one or more resources during the monitoring.

Figure 13:
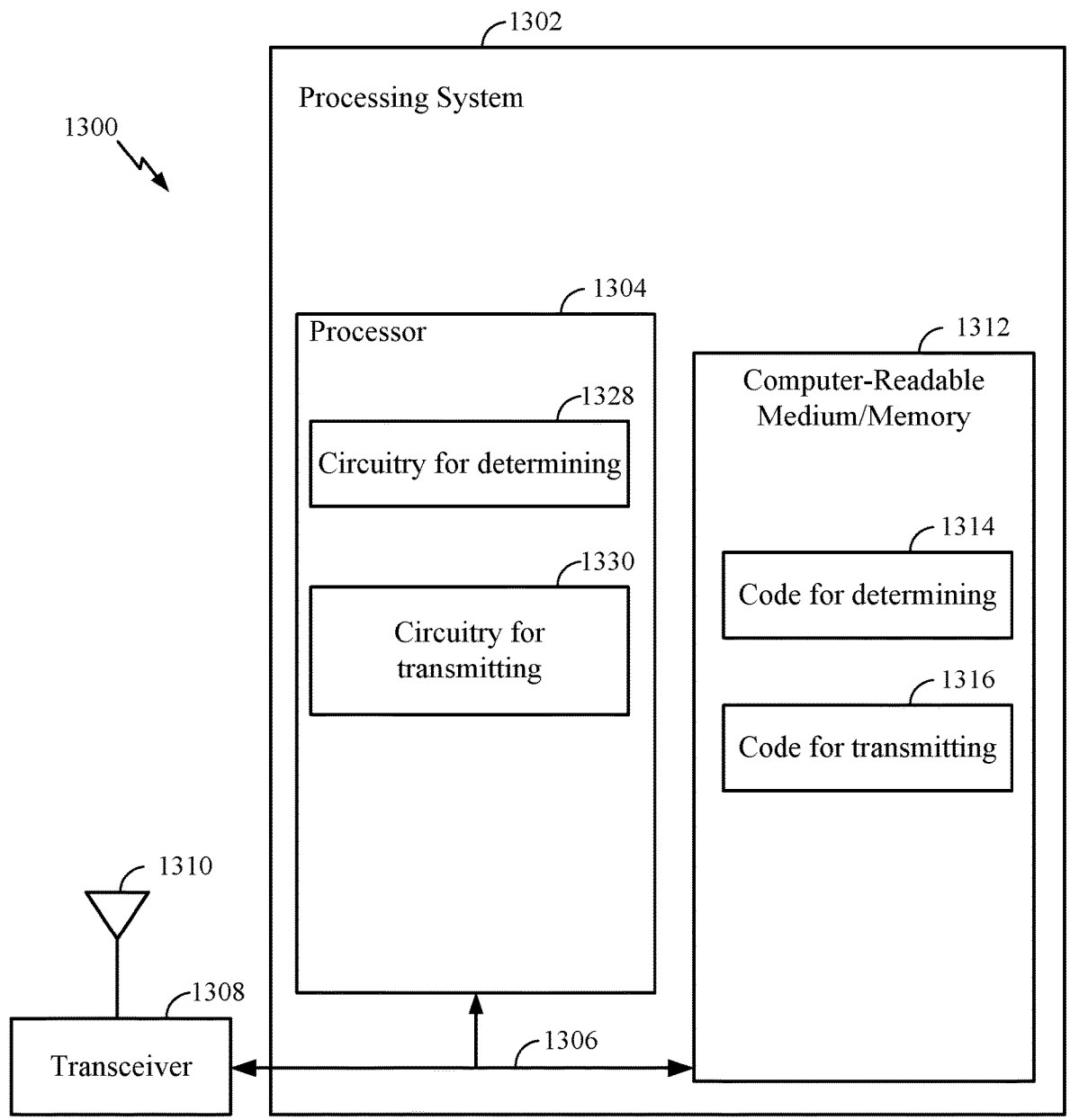
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIGS. 7-11. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 904 to perform the operations illustrated in FIGS. 7-11, or other operations for performing the various techniques discussed herein for wake-up resource randomization and sharing. In certain aspects, computer-readable medium/memory 1312 stores code for performing the operations illustrated in one or more of FIGS. 7-11. For example, computer-readable medium/memory 1312 stores code 1314 for determining configuration information for receiving, at a user equipment (UE), at least one wake up signal (WUS) during an OFF duration of a discontinuous reception (DRX) mode of the UE. Additionally, computer-readable medium/memory 1312 stores code 1316 for transmitting the configuration information to the UE and transmitting the at least one WUS in one or more of the resources based on the configuration information.

In certain aspects, the processor 1304 may include circuitry configured to implement the code stored in the computer-readable medium/memory 1312, such as for performing the operations illustrated in FIGS. 7-11. For example, the processor 1304 includes circuitry 1328 for determining configuration information for receiving, at a user equipment (UE), at least one wake up signal (WUS) during an OFF duration of a discontinuous reception (DRX) mode of the UE. Additionally, processor 1304 includes circuitry 1330 for transmitting the configuration information to the UE and transmitting the at least one WUS in one or more of the resources based on the configuration information.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a user equipment (UE), comprising:
   obtaining configuration information for receiving at least one wake up signal (WUS) during an OFF duration of a discontinuous reception (DRX) mode of the UE, wherein:
      the configuration information comprises at least one of:
         a UE-specific resource hopping pattern comprising a recurring set of UE-specific resources assigned to the UE for receiving the at least one WUS, or
         a scrambling sequence hopping pattern comprising a recurring set of scrambling sequences assigned to the UE for receiving the at least one WUS; and
      the configuration information indicates at least one of a length of time that the recurring set of UE-specific resources are assigned to the UE in the UE-specific hopping pattern or a length of time that the recurring set of scrambling sequences are assigned to the UE in the scrambling sequence hopping pattern;
   monitoring, during a WUS monitoring occasion occurring during the OFF duration of the DRX mode, for the at least one WUS based on the configuration information; and
   transitioning to an ON state of the DRX mode when the at least one WUS is detected based on the configuration information during the monitoring; or
   remaining in an OFF state of the DRX mode when the at least one WUS is not detected based on the configuration information during the monitoring.

2. The method of claim 1, wherein:
   monitoring for the at least one WUS comprises monitoring the recurring set of resources for the at least one WUS based on the UE-specific resource hopping pattern.

3. The method of claim 2, wherein:
the at least one WUS comprises at least one physical downlink control channel (PDCCH)-based WUS; and
the UE-specific resource hopping pattern comprises at least one of a search-space hopping pattern or a CORE-SET hopping pattern.

4. The method of claim 2, wherein monitoring comprises:
switching from monitoring for the at least one WUS in a first resource of the recurring set of resources to monitoring for the at least one WUS in a second resource of the recurring set of resources based, at least in part, on the length of time that the at least one hopping pattern is assigned to the UE.

5. The method of claim 1, wherein the DRX mode comprises one of:
a connected mode DRX (CDRX) mode; or
an idle mode DRX (IDRX) mode.

6. The method of claim 1, wherein the configuration information is obtained in one of:
a radio resource control (RRC) message;
a media access control control element (MAC-CE); or
a physical downlink control channel (PDCCH) message.

7. The method of claim 1, wherein:
the UE shares one or more resources for receiving the at least one WUS with one or more other UEs; and
monitoring for the at least one WUS comprises monitoring the shared one or more resources for the at least one WUS based on the scrambling sequence hopping pattern.

8. The method of claim 7, wherein:
the WUS is scrambled with a scrambling sequence in the recurring set of resources assigned to the UE; and
monitoring comprises monitoring the one or more shared resources for the at least one WUS scrambled with the scrambling sequence in the recurring set of resources assigned to the UE.

9. The method of claim 8, wherein transitioning to the ON state of the DRX mode comprises:
receiving a signal transmitted in the one or more shared resources;
determining that the signal is scrambled with the scrambling sequence in the recurring set of resources assigned to the UE;
detecting the at least one WUS by decoding the signal based on the determination; and
transitioning to the ON state of the DRX mode based on the detection of the at least one WUS.

10. The method of claim 8, wherein remaining in the OFF state of the DRX mode comprises:
receiving a signal transmitted in the one or more shared resources;
determining that the signal is not scrambled with the scrambling sequence in the recurring set of resources assigned to the UE;
detecting that the signal does not contain a WUS intended for the UE based on the determination; and
remaining in the OFF state of the DRX mode based on the detection.

11. The method of claim 7, wherein:
the at least one WUS comprises at least one physical downlink control channel (PDCCH)-based WUS;
the at least one PDCCH-based WUS comprises at least one of:
a demodulation reference signal (DMRS), transmitted on a PDCCH in the one or more shared resources, scrambled with a scrambling sequence in the recurring set scrambling sequences assigned to the UE; or
a downlink control information (DCI) message, transmitted on the PDCCH in the one or more shared resources, scrambled with a scrambling sequence in the recurring set of scrambling sequences assigned to the UE; and
monitoring the one or more shared resources for the at least one WUS comprises monitoring for at least one of the DMRS scrambled with the scrambling sequence or the DCI message scrambled with the scrambling sequence.

12. The method of claim 7, wherein monitoring comprises:
switching from monitoring for the at least one WUS using a first scrambling sequence of the recurring set of scrambling sequences to monitoring for the at least one WUS using a second scrambling sequence of the recurring set of scrambling sequences based, at least in part, on the length of time that the at least one hopping pattern is assigned to the UE.

13. A method of wireless communication by a base station, comprising:
determining configuration information for receiving, at a user equipment (UE), at least one wake up signal (WUS) during an OFF duration of a discontinuous reception (DRX) mode of the UE, wherein:
the configuration information comprises at least one of:
a UE-specific resource hopping pattern comprising a recurring set of UE-specific resources assigned to the UE for receiving the at least one WUS, or
a scrambling sequence hopping pattern comprising a recurring set of scrambling sequences assigned to the UE for receiving the at least one WUS; and
the configuration information indicates at least one of a length of time that the recurring set of UE-specific resources are assigned to the UE in the UE-specific hopping pattern or a length of time that the recurring set of scrambling sequences are assigned to the UE in the scrambling sequence hopping pattern;
transmitting the configuration information to the UE; and
transmitting the at least one WUS in one or more resources based on the configuration information.

14. The method of claim 13, wherein:
the at least one WUS comprises at least one physical downlink control channel (PDCCH)-based WUS; and
the UE-specific resource hopping pattern comprises at least one of a search-space hopping pattern or a CORE-SET hopping pattern.

15. The method of claim 13, wherein transmitting the at least one WUS comprises:
switching from transmitting the at least one WUS in a first resource of the recurring set of resources to transmitting the at least one WUS in a second resource of the recurring set of resources based, at least in part, on the length of time that the at least one hopping pattern is assigned to the UE.

16. The method of claim 13, wherein:
the UE shares one or more resources for receiving the at least one WUS with one or more other UEs.

17. The method of claim 16, wherein transmitting the at least one WUS comprises:
scrambling the WUS with a scrambling sequence in the recurring set of resources assigned to the UE; and
transmitting the at least one WUS scrambled with the scrambling sequence in the recurring set of resources assigned to the UE.

18. The method of claim 16, wherein the at least one WUS comprises at least one physical downlink control channel (PDCCH)-based WUS.

19. The method of claim 16, wherein the at least one PDCCH-based WUS comprises at least one of:
a demodulation reference signal (DMRS), transmitted on a PDCCH in the one or more shared resources, scrambled with a scrambling sequence in the recurring set of scrambling sequences assigned to the UE; or
a downlink control information (DCI) message, transmitted on the PDCCH in the one or more shared resources, scrambled with a scrambling sequence in the recurring set scrambling sequences assigned to the UE.

20. The method of claim 16, wherein transmitting the at least one WUS comprises:
switching from transmitting the at least one WUS using a first scrambling sequence in the recurring set of scrambling sequences to transmitting the at least one WUS using a second scrambling sequence in the recurring set of scrambling sequences based, at least in part, on the length of time that the at least one hopping pattern is assigned to the UE.

21. The method of claim 13, wherein the configuration information is transmitted in one of:
a radio link control (RLC) message;
a media access control control element (MAC-CE); or
a physical downlink control channel (PDCCH) message.

22. An apparatus for wireless communication by a user equipment (UE), comprising:
at least one processor configured to:
obtain configuration information receiving at least one wake up signal (WUS) during an OFF duration of a discontinuous reception (DRX) mode of the UE, wherein:
the configuration information comprises at least one of:
a UE-specific resource hopping pattern comprising a recurring set of UE-specific resources assigned to the UE for receiving the at least one WUS, or
a scrambling sequence hopping pattern comprising a recurring set of scrambling sequences assigned to the UE for receiving the at least one WUS; and
the configuration information indicates at least one of a length of time that the recurring set of UE-specific resources are assigned to the UE in the UE-specific hopping pattern or a length of time that the recurring set of scrambling sequences are assigned to the UE in the scrambling sequence hopping pattern;
monitor, during a WUS monitoring occasion occurring during the OFF duration of the DRX mode, for the at least one WUS based on the configuration information;

transition to an ON state of the DRX mode when the at least one WUS is detected based on the configuration information during the monitoring; or
remain in an OFF state of the DRX mode when the at least one WUS is not detected based on the configuration information during the monitoring; and
a memory coupled with the at least one processor.

23. An apparatus for wireless communication by a base station, comprising:
at least one processor configured to:
determine configuration information for receiving, at a user equipment (UE), at least one wake up signal (WUS) during an OFF duration of a discontinuous reception (DRX) mode of the UE, wherein:
the configuration information comprises at least one of:
a UE-specific resource hopping pattern comprising a recurring set of UE-specific resources assigned to the UE for receiving the at least one WUS, or
a scrambling sequence hopping pattern comprising a recurring set of scrambling sequences assigned to the UE for receiving the at least one WUS; and
the configuration information indicates at least one of a length of time that the recurring set of UE-specific resources are assigned to the UE in the UE-specific hopping pattern or a length of time that the recurring set of scrambling sequences are assigned to the UE in the scrambling sequence hopping pattern;
transmit the configuration information to the UE; and
transmit the at least one WUS in one or more resources based on the configuration information.

24. The method of claim 1, wherein at least one of:
the UE-specific resource hopping pattern is different from other UE-specific resource hopping patterns for other UEs, or
the scrambling sequence hopping pattern is different from other scrambling sequence hopping patterns for other UEs.

25. The method of claim 1, wherein:
the UE shares a DRX cycle with at least one other UE, and at least one of:
resources in the recurring set of resources assigned to the UE for receiving the at least one WUS do not conflict with resources in another recurring set of resources assigned to another UE for receiving another WUS during the shared DRX cycle, or
scrambling sequences in the recurring set of scrambling sequences assigned to the UE for receiving the at least one WUS do not conflict with scrambling sequences in another recurring set of scrambling sequences assigned to another UE for receiving another WUS during the shared DRX cycle.

\* \* \* \* \*